United States Patent [19]

Schwengler

[11] Patent Number: 6,011,979
[45] Date of Patent: Jan. 4, 2000

[54] METHOD FOR SELECTING AN AMPLIFIER FOR USE IN A PERSONAL COMMUNICATION SERVICE BASE STATION

[75] Inventor: Thomas Schwengler, Lakewood, Colo.

[73] Assignee: U S West, Inc., Denver, Colo.

[21] Appl. No.: 08/992,969

[22] Filed: Dec. 18, 1997

[51] Int. Cl.⁷ .............................. H04B 1/38; H04M 1/00
[52] U.S. Cl. ........................................ 455/561; 455/67.3
[58] Field of Search ................................... 455/561, 560, 455/446, 67.1, 67.3, 423

[56] References Cited

U.S. PATENT DOCUMENTS

| | | | |
|---|---|---|---|
| 4,905,308 | 2/1990 | Davidson | 455/226 |
| 5,109,535 | 4/1992 | Kume et al. | 455/67.4 |
| 5,361,258 | 11/1994 | Arnold et al. | 370/69.1 |
| 5,604,925 | 2/1997 | O'Malley et al. | 455/254 |
| 5,606,729 | 2/1997 | D'Amico et al. | 455/67.1 |
| 5,920,813 | 7/1999 | Evans et al. | 455/422 |

*Primary Examiner*—Nguyen Vo
*Assistant Examiner*—Naghmeh Mehrpour
*Attorney, Agent, or Firm*—Brooks & Kushman

[57] ABSTRACT

A method for selecting a tower-top low-noise amplifier (LNA) having a given level of performance which matches the level of performance needed for a PCS base station includes providing a PCS base station having an antenna, a cable, and a cell. The antenna, the cable, and the cell have an associated loss and noise figure. The noise figure of the antenna is estimated using internal and external antenna noise temperatures. The external antenna noise temperature accounts for contributions due to lightning noises, atmospheric emission noises, celestial noises, ground noises, and man-made noises including microwave oven noises. The noise figure of the PCS base station is then estimated based on the noise figures of the antenna, the cable, and the cell. An LNA having a gain and a noise figure which cause the estimated noise figure of the PCS base station to fall within an acceptable range is then selected for the PCS base station.

3 Claims, 2 Drawing Sheets

METHOD FOR SELECTING AN AMPLIFIER FOR USE IN A PERSONAL COMMUNICATION SERVICE BASE STATION

TECHNICAL FIELD

The present invention relates generally to personal communication service (PCS) base stations and, more particularly, to a method for selecting a tower-top low-noise amplifier (LNA) of a PCS base station.

BACKGROUND ART

The noise level at a personal communication system (PCS) base station is the determining quantity in the uplink. The noise levels of base stations vary greatly as a result of the variance among the many different factors affecting the noise levels. Sensitivity of a base station can be increased by the presence of a tower-top low-noise amplifier (LNA).

However, in the past, PCS providers select an LNA having a given gain which may be too high or too low for a particular base station. Consequently, an expensive LNA having a high gain may not be needed for a particular base station. Similarly, an inexpensive LNA having a low gain may not be sufficient for a particular base station.

SUMMARY OF THE INVENTION

Accordingly, it is an object of the present invention to provide a method for selecting an LNA having a given level of performance which matches the level of performance needed for a particular PCS base station.

It is another object of the present invention to provide a method for selecting an LNA for a PCS base station which considers several noise sources including antenna temperature at the PCS base station for determining the given level of performance needed for the PCS base station.

It is a further object of the present invention to provide a method for determining whether an LNA is needed for a PCS base station.

In carrying out the above objects and other objects, the present invention provides a method for selecting an LNA having a given level of performance which matches the level of performance needed for a PCS base station. The method includes providing a PCS base station having an antenna, a cable, and a cell. The antenna, the cable, and the cell have an associated loss and noise figure. The noise figure of the antenna is estimated using internal and external antenna noise temperatures. The external antenna noise temperature accounts for contributions due to lightning noises, atmospheric emission noises, celestial noises, ground noises, and man-made noises including microwave oven noises. The noise figure of the PCS base station is then estimated based on the noise figures of the antenna, the cable, and the cell. An LNA having a gain and a noise figure which causes the estimated noise figure of the PCS base station to fall within an acceptable range is then selected for the PCS base station.

These and other features, aspects, and embodiments of the present invention will become better understood with regard to the following description, appended claims, and accompanying drawings.

BEST MODES FOR CARRYING OUT THE INVENTION

Figure 1:
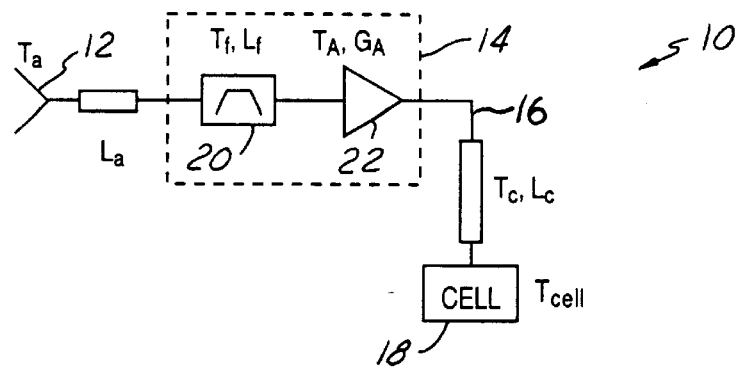
FIG. 1 is a diagram illustrating a personal communication service (PCS) base station with a towertop low-noise amplifier (LNA)

Referring now to FIG. 1, a personal communication service (PCS) base station 10 is shown. Base station 10 includes an antenna 12, a tower-top low-noise amplifier (LNA) 14, a cable 16, and a cell 18. LNA 14 includes a filter 20 and an amplifier 22. Cable 16 serially connects antenna 12, LNA 14, and cell 18. Cell 18 includes base station equipment. Base station 10 uses Code Division Multiple Access (CDMA) for communication and preferably operates around 2 GHz. Each of the devices of base station 10 has a given loss or gain as well as an effective temperature represented by the following symbols:

$T_a$: Antenna 12 effective temperature
$L_a$: Antenna 12 insertion loss
$T_c$: Cable 16 effective temperature
$L_c$: Cable 16 loss
$T_f$: Filter 20 effective temperature
$L_f$: Filter 20 loss
$T_A$: Amplifier 22 effective temperature
$G_A$: Amplifier 22 gain
$T_{cell}$: Cell 18 effective temperature The effective temperature of the devices of base station 10 can be represented by the noise figure which is related to the effective temperature by the following equation:

$$F_{dB} = 10 \cdot \log\left(1 + \frac{T_{eff}}{T_0}\right) \quad (1)$$

where:

$F_{dB}$ is the noise figure (in dB),
$T_{eff}$ is the effective temperature of the device, and
$T_0$ is the reference temperature of 290 K.

The overall effective temperature $T_{tot}$ (or the overall noise figure $F_{tot}$) of base station 10 can be determined by calculating the cascaded influence of each of the devices. To facilitate the calculation, let filter 20 and amplifier 22 be represented by LNA 14 having an effective temperature $T_{LNA}$ and a gain $G_{LNA}$ where:

$$T_{LNA} = T_f + T_A \cdot L_f \quad (2)$$

$$G_{LNA} = G_A / L_f \quad (3)$$

The cascaded calculations then lead to the following equations:

$$F_{tot} = F_a + (F_{LNA} - 1) \cdot L_a + (F_c - 1) \cdot \frac{L_a}{G_{LNA}} + \quad (4)$$

$$(F_{cell} - 1) \cdot \frac{L_a \cdot L_c}{G_{LNA}}$$

$$T_{tot} = T_a + T_{LNA} \cdot L_a + T_c \cdot \frac{L_a}{G_{LNA}} + T_{cell} \cdot \frac{L_a \cdot L_c}{G_{LNA}} \quad (5)$$

where:

$F_{tot}$ is the total noise figure (in dB) of base station 10, $F_a$ is the noise figure of antenna 12, $F_{LNA}$ is the noise figure of LNA 14, $F_c$ is the noise figure of cable 16, $F_{cell}$ is the noise figure of cell 18, and $T_{tot}$ is the total effective temperature of the base station.

The total noise figure $F_{tot}$ of base station 10 depends directly on the noise figure $F_a$ of antenna 12. Thus, the noise figure $F_a$ of antenna 12 is a critical parameter and it will be discussed in greater detail later. First, consider the noise contribution due to the other devices of base station 10 such as LNA 14, cable 16, and cell 18. Pose the following equations:

$$F_{tot} = F_a + (F_{sys} - 1) \cdot L_a \quad (6)$$

and $$T_{tot} = T_a + T_{sys} \cdot L_a \quad (7)$$

where:

$F_{sys}$ is the noise figure (in dB) of the system of base station 10 without antenna 12 connected to the feed of an ideal antenna, and $T_{sys}$ is the effective temperature of the system of the base station without the antenna connected to the feed of an ideal antenna.

The noise figure $F_{cell}$ of cell 18 typically falls in the range of 3.5 to 5 dB. The noise figure $F_c$ of cable 16 typically falls in the range of 1.5 to 2 dB. Thus, without LNA 14, the overall system noise figure $F_{sys}$ falls in the range of 5 to 7 dB. This degradation can be limited by providing an LNA for base station 10. If an LNA is included, the noise figure $F_{LNA}$ as well as the gain $G_{LNA}$ of the LNA become critical in determining the system noise figure $F_{sys}$.

Figure 2:
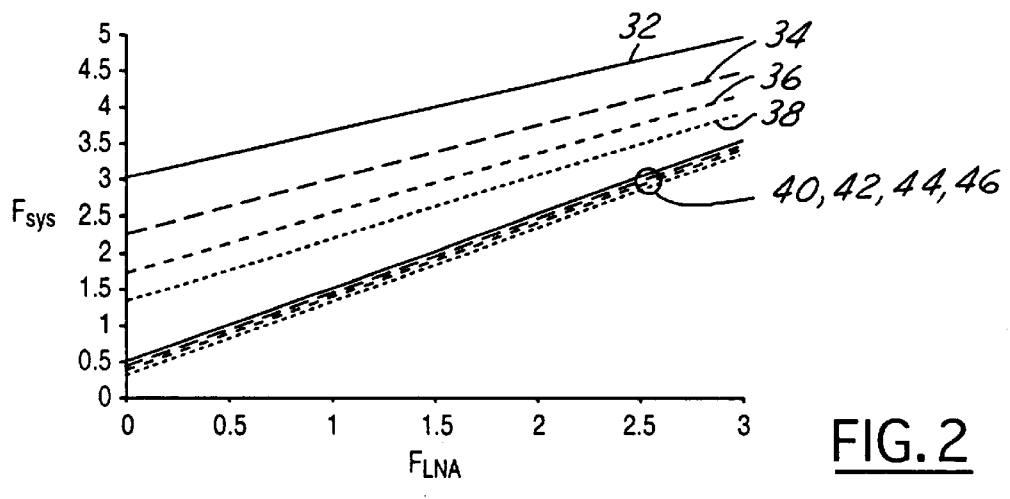
FIG. 2 is a graph illustrating the influence on the noise figure $F_{sys}$ of adding an LNA to a PCS base station as a function of cable loss.

Referring now to FIG. 2, a graph 30 illustrates the influence on the system noise figure $F_{sys}$ of adding an LNA to a base station as a function of cable loss. Graph 30 compares the system noise figure $F_{sys}$ along the y-axis versus the noise figure $F_{LNA}$ of the LNA across the x-axis. Graph 30 includes plots 32, 34, 36, and 38 corresponding to a cable loss ($L_c$) of 6 dB, 4 dB, 2 dB, and 0 dB, respectively, with an LNA having a gain of 10 dB. Graph 30 further includes plots 40, 42, 44, and 46 corresponding to a cable loss ($L_c$) of 6 dB, 4 dB, 2 dB, and 0 dB, respectively, with an LNA having a gain of 20 dB.

As can be appreciated from FIG. 2, an LNA having a gain of 10 dB is not quite sufficient to remove the degradation due to cable loss. An LNA having a gain of 20 dB represents a better solution in which case 0 to 6 dB of cable loss can be tolerated without significant impact.

Figure 3:
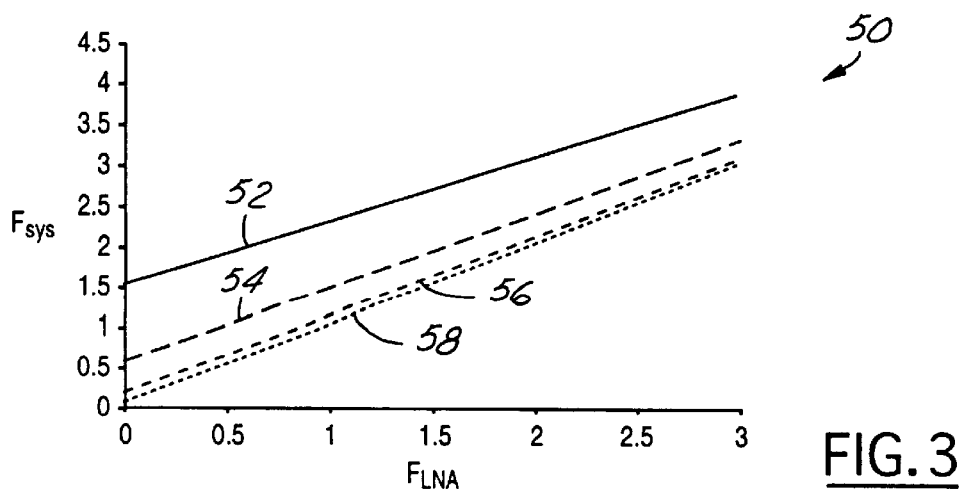
FIG. 3 is a graph illustrating the influence on the noise figure $F_{sys}$ of adding an LNA to a PCS base station as a function of the gain of the LNA.

Referring now to FIG. 3, a graph 50 illustrates the influence on the noise figure $F_{sys}$ of adding an LNA to a base station as a function of the gain of the LNA. Graph 50 compares the system noise figure $F_{sys}$ along the y-axis versus the noise figure $F_{LNA}$ of the LNA across the x-axis. Graph 50 includes plots 52, 54, 56, and 58 corresponding to an LNA having a gain of 10 dB, 15 dB, 20 dB, and 25 dB, respectively, with a cable loss of 2 dB.

As can be appreciated from FIG. 3, an LNA having a gain of 20 dB appears to be optimal. Using an LNA having a gain of 25 dB as compared to using an LNA having a gain of 20 dB does not significantly improve the system. In contrast, using an LNA having a gain of 15 dB as compared to using an LNA having a gain of 20 dB significantly degrades the system. Selecting an LNA with an appropriate gain is important. An LNA with an insufficient gain does not sufficiently increase the sensitivity of the base station. An LNA with too large of a gain introduces intermodulation in the base station. In short, using an LNA with an improper gain causes lost capacity or coverage for the base station.

In addition to the system noise figure $F_{sys}$ the noise figure $F_a$ and the effective temperature $T_a$ of the antenna must also be taken into account. The effective temperature $T_a$ of antenna 12 is expressed as the sum of the internal noise temperature $T_{int}$ (thermal noise of the antenna circuitry) and the external noise temperature $T_{ext}$. In general:

$$T_a = \frac{T_{int} + T_{ext}}{L_a} \quad (8)$$

where $T_{int} + T_{ext}$ represents the noise temperature at the output of an ideal antenna followed by an attenuation $L_a$ of an attenuator. Tint represents the effective temperature of that attenuator according to the equation:

$$T_{int} = (L_a - 1) \cdot T_{physical} \quad (9)$$

where $T_{physical}$ is the physical temperature of antenna 12. It is assumed in equation 9 that antenna 12 is perfectly matched and that the insertion loss is equivalent to the internal loss.

The external noise temperature $T_{ext}$ of antenna 12 is split into the following categories, each expressed in brightness temperature:

$T_{lightning}$: noise due to lightning discharges, $T_{atmospheric}$: noise due to emission from atmospheric gases and hydrometeors, $T_{celestial}$: noise due to celestial radio sources (including the sun, moon, etc.), $T_{ground}$: noise due to ground, building, and other obstructions within the beam of the antenna, and $T_{man-made}$: noise due to electrical and electronic equipment (mainly microwave ovens), power transmission lines, engine ignition, etc.

Figure 4:
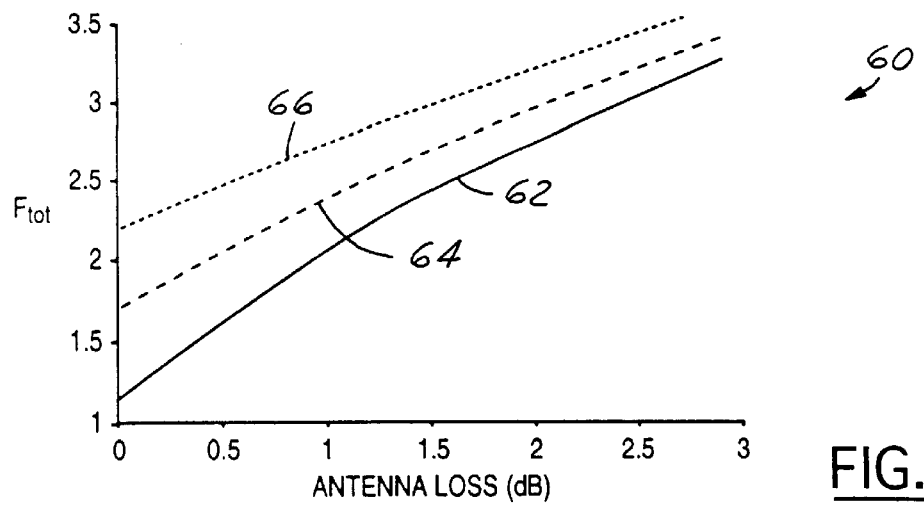
FIG. 4 is a graph which illustrates the importance of antenna efficiency.

Before describing in detail the above-identified individual noise contributions, refer now to FIG. 4 which illustrates the importance of antenna efficiency with a graph 60. Graph 60 compares the system noise figure $F_{tot}$ of base station 10 along the y-axis versus the antenna loss (dB) across the x-axis. Graph 60 includes plots 62, 64, and 66 corresponding to external noise temperature $T_{ext}$. An LNA having a gain of 20 dB and a noise figure $F_{LNA}$ of 1 dB is also taken into account in graph 60. In other words, graph 60 illustrates the influence of antenna loss in the best possible case, its influence is much worse when the LNA is absent (or has an insufficient gain).

As mentioned above, a number of individual noise sources contribute to the external noise temperature $T_{ext}$ of antenna 12. These noise sources will now be described in detail.

First, $T_{lightning}$ can be estimated with the assistance of geographic maps of the world showing the expected mean values of background atmospheric radio noise. Upon review of such maps, influence is noticeable around broadcasting frequencies of 1 MHz and ceases to have any measurable influence above 30 Mhz. Thus, $T_{lightning}$ does not need to be taken into account for a PCS base station operating at 2 GHz.

Second, $T_{atmospheric}$ can be estimated from measurements made on sky noises due to oxygen and water vapor in the atmosphere and from studies of cloud effects. For instance, brightness temperature of clear air (7.5 g/m$^3$ of water vapor) is 70 K at 0° elevation and 2 K at 90° elevation. In practice, antennas of PCS base stations illuminate at low values of elevation and have low azimuthal gain. Typically, these antennas have an atmospheric temperature of about 20 K.

Third, $T_{celestial}$ can be estimated from considering several causes. These causes include cosmic background which radiates as a black body of 2.7 K. Galactic noise is caused by stars in the Milky Way. The galactic noise can be estimated from detailed maps of the sky. At an operation frequency of 2 GHz, the average brightness temperature is 50 K at 0° elevation and negligible at 90° elevation.

The sun and moon also contribute to $T_{celestial}$ Because a PCS antenna may see the horizon, the ambient noise contribution of the sun needs to be evaluated. The quiet sun is a disc of 0.5° radiating approximately as a 100,000 K black body. A beamwidth of 0.5° pointed at the sun would see an antenna temperature of that order. For higher antenna beamwidth, however, the antenna temperature decreases with the square of the beamwidth relative to the 0.5° sun. For PCS base stations, antennas having a 90° beamwidth are typically used and their antenna noise contribution is up to about 4 K. (7 K if a 60° antenna is used, e.g., for angular diversity schemes.)

For precise noise contributions of the sun, the 11-year sunspot cycle must be taken into consideration. Bright spots and transient disturbances such as flares can increase the temperature of the sun by an order of magnitude. Still, the contribution of the sun remains small in the calculations. The moon is also a disc of 0.5° and has a temperature much lower than the sun and therefore its noise contribution can be discarded.

Fourth, $T_{ground}$ has a dominant effect as a result of the antenna illuminating the ground. Accurate calculations of ground temperature involve atmospheric contribution and integration of radiation over the ground area lit by the antenna. Precise models also include a stratified ground with different dielectric characteristics because reflection varies with depth of penetration. Nevertheless, a simplified calculation can be made as follows:

$$T_{ground} = \in \cdot T_{surf} + \rho \cdot T_{sky} \quad (10)$$

where:

$T_{surf}$ is the physical temperature of the earth surface, $T_{sky}$ is the average brightness sky temperature, $\in$ is the effective emissivity of the earth surface, and $\rho$ is the effective reflection coefficient ($\rho + \in = 1$.

The effective emissivity ($\in$) depends on the ground surface (smooth field, rough terrain, buildings, roads, water, etc.) The effective emissivity ($\in$) also varies greatly with moisture content of the ground and depends significantly on incident angle and the polarity of the signal.

In dry conditions, soil emissivity varies from 0.85 (concrete, asphalt) to 0.90 (grass) or 0.95 (rough soil & vegetation). Water has a lower emissivity (0.4) because of its higher dielectric constant and therefore moist soil has a decreased emissivity. For a given soil, emissivity decreases from 0.85 to 0.65 when volumetric soil moisture increases from 5% to 20%. The brightness temperature of the ground varies accordingly. Measurements have been made on diurnal and pluvial variations showing that ground brightness temperature increases by 30 K over a few hours after rain simply because of the drying and draining of the ground.

Figure 5:
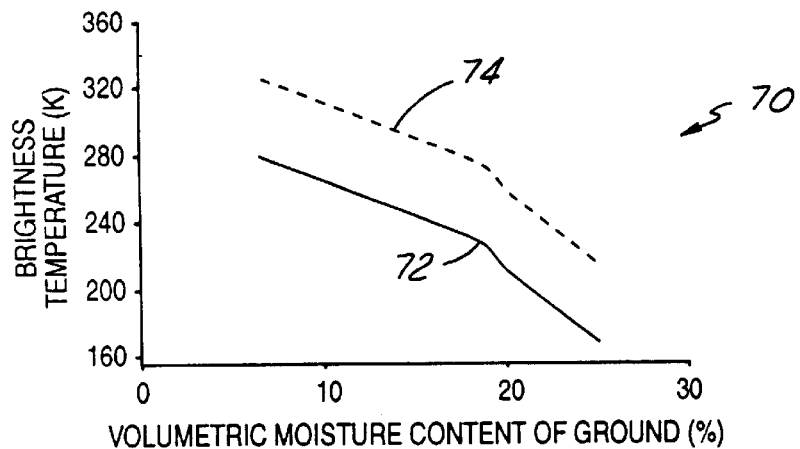
FIG. 5 is a graph illustrating brightness temperatures for smooth and rough ground surfaces as a function of the volumetric moisture content of the ground.

Referring now to FIG. 5, a graph 70 illustrates brightness temperatures for smooth and rough ground surfaces as a function of the volumetric moisture content of the ground. Graph 70 includes smooth terrain plot 72 and rough terrain plot 74.

The smoothness of the terrain represented on graph 70 accounts for variations of 50 K. In summary, the ground brightness temperature is lower in a smooth, cool, and humid area.

At low incident angles, variations with polarization are also important because brightness temperature varies significantly between horizontal and vertical polarization. On average, in a PCS base station operating at 2 GHz (considering multipath with various incidence angles) brightness temperature can be roughly estimated to decrease by 30 K for horizontal polarization and to increase by that much for vertical polarization (when compared to circular polarization).

Fifth, $T_{man-made}$ can be estimated with the following typical values at 2 GHz: 150 K in a noisy urban area, 50 to 100 K in a low-density or residential area, and 10 K or less in a rural area.

Using the five factors discussed above, $T_{lightning}$, $T_{atmospheric}$, $T_{celestial}$, $T_{groud}$, and $T_{man-made}$, the antenna temperature $T_a$ can be estimated and the total noise figure $F_{tot}$ of the system can be calculated.

Figure 6:
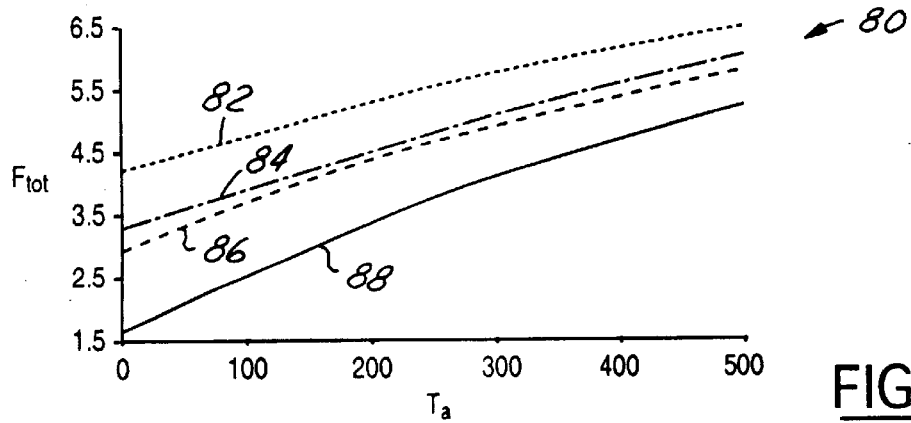
FIG. 6 is a graph representing an example of calculating the total noise figure $F_{tot}$ from the antenna temperature $T_a$.

Referring now to FIG. 6, a graph 80 representing an example of calculating the total noise figure $F_{tot}$ from the antenna temperature $T_a$ is shown. Graph 80 includes plots 82 and 84 showing the total noise figure $F_{tot}$ for an LNA having a gain of 10 dB with a 1 dB and a 2 dB LNA noise figure $F_{LNA}$, respectively. Graph 80 further includes plots 86 and 88 showing the total noise figure $F_{tot}$ for an LNA having a gain of 20 dB with a 1 dB and a 2 dB LNA noise figure $F_{LNA}$, respectively.

With an LNA having a higher gain, the total noise figure $F_{tot}$, decreases. Also, the LNA noise figure $F_{LNA}$ directly influences the total noise figure $F_{tot}$. Graph 80 is useful to estimate the total noise figure $F_{tot}$ for a given base station and a decision can be made on whether an LNA is needed to improve the total noise figure $F_{tot}$ and at what level of performance the LNA is required to have.

For example, at a noisy base station such as downtown, near industrial buildings, in a hot and dry area, etc., an LNA having a high level of performance (high gain) may be needed to improve the sensitivity of the base station. Conversely, at a quiet base station such as at a cool and humid area an LNA having a high level of performance results in a insignificant increase in sensitivity.

In summary, the noise figure analysis presented above combined with an estimate of antenna temperature of a PCS base station allows the performance of the PCS base station to be approximately quantified. These calculations are valuable because they allow evaluation of the potential need for a tower-top low-noise amplifier at a particular base station, as well as the optimal level of performance (and price).

Thus, it is apparent that there has been provided, in accordance with the present invention, a method for selecting an LNA having a given level of performance which matches the level of performance needed for a particular PCS base station that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for selecting a tower-top low-noise amplifier (LNA) having a given level of performance which matches the level of performance needed for a personnel communication system (PCS) base station, the method comprising:

providing a PCS base station having an antenna, a cable, and a cell, wherein the antenna, the cable, and the cell have an associated loss and noise figure, wherein the noise figure of the antenna is estimated using internal and external antenna noise temperatures, wherein the external antenna noise temperature accounts for contributions due to lightning noises, atmospheric emission noises, celestial noises, ground noises, and man-made noises including microwave oven noises;

estimating the noise figure of the PCS base station based on the noise figures of the antenna, the cable, and the cell; and selecting for the PCS base station an LNA having a gain and a noise figure which cause the estimated noise figure of the PCS base station to fall within an acceptable range.

2. The method of claim 1 wherein:

the noise figure of the PCS base station is estimated using the equation:

$$F_{tot} = F_a + (F_{LNA} - 1) \cdot L_a + (F_c - 1) \cdot \frac{L_a}{G_{LNA}} + (F_{cell} - 1) \cdot \frac{L_a \cdot L_c}{G_{LNA}}$$

where:

$F_{tot}$ is the total noise figure (in dB) of the PCS base station, $F_a$ is the noise figure of the antenna, $F_{LNA}$ is the noise figure of LNA, $F_c$ is the noise figure of the cable, $F_{cell}$ is the noise figure of the cell, $L_a$ is the loss of the antenna, $L_c$ is the loss of the cable, and $G_{LNA}$ is the gain of the LNA.

3. The method of claim 1 wherein:

the LNA consists of an amplifier and a filter.

* * * * *